(12) United States Patent
Sugihara et al.

(10) Patent No.: US 8,001,839 B2
(45) Date of Patent: Aug. 23, 2011

(54) SENSOR UNIT

(75) Inventors: Hisayoshi Sugihara, Aichi-ken (JP);
Yutaka Nonomura, Nagoya (JP);
Motohiro Fujiyoshi, Seto (JP); Kouji Tsukada, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 849 days.

(21) Appl. No.: 11/989,605

(22) PCT Filed: Aug. 1, 2006

(86) PCT No.: PCT/IB2006/002102
§ 371 (c)(1),
(2), (4) Date: Jan. 29, 2008

(87) PCT Pub. No.: WO2007/015148
PCT Pub. Date: Feb. 8, 2007

(65) Prior Publication Data
US 2010/0089155 A1    Apr. 15, 2010

(30) Foreign Application Priority Data
Aug. 1, 2005  (JP) ................................. 2005-223509

(51) Int. Cl.
*G01P 1/02* (2006.01)
(52) U.S. Cl. ........................... 73/493; 73/510
(58) Field of Classification Search ............ 73/493, 73/510, 504.02, 504.03, 514.01
See application file for complete search history.

(56) References Cited

U.S. PATENT DOCUMENTS

| 5,038,613 A | * | 8/1991 | Takenaka et al. ........... 73/510 |
| 2004/0169244 A1 | | 9/2004 | MacGugan |
| 2004/0200279 A1 | * | 10/2004 | Mitani et al. ........... 73/504.03 |

FOREIGN PATENT DOCUMENTS

| CN | 2554053 Y | 6/2003 |
| DE | 101 37 749 A1 | 2/2003 |
| JP | 62-118260 | 5/1987 |
| JP | 7-260495 | 10/1995 |
| JP | 9-329438 | 12/1997 |
| JP | 10-153615 | 6/1998 |
| JP | 2003-28646 | 1/2003 |
| JP | 2004-45154 | 2/2004 |

(Continued)

OTHER PUBLICATIONS

International Search Report.

(Continued)

*Primary Examiner* — John E Chapman
(74) *Attorney, Agent, or Firm* — Finnegan, Henderson, Farabow, Garrett & Dunner, LLP

(57) ABSTRACT

A sensor unit has a reference base. An acceleration sensor block and angular velocity sensor support rods are arranged on the reference base, using a bottom face and one side face of the reference base as reference faces. Three acceleration sensors, which detect accelerations that act in the directions in which an X-axis, a Y-axis, and a Z-axis extend, are fitted to three faces of the acceleration sensor block, respectively. Three angular velocity sensors, which detect angular velocities about the X-axis, the Y-axis, and the Z-axis, are fitted to boards that are fitted, via rubber bushings serving as vibration-proofing rubber members, to the angular velocity sensor support rods with screws, respectively.

4 Claims, 3 Drawing Sheets

FOREIGN PATENT DOCUMENTS

JP 2004-85562 3/2004
JP A-2004-268730 9/2004

OTHER PUBLICATIONS

Written Opinion of the ISR.
Notification of Reason(s) for Refusal for JP 2007-554682 dated Jul. 13, 2010.
Office Action issued Aug. 21, 2009, in Chinese Appln. No. 200680028090.9.
International Search Report in International Application No. PCT/IB2006/002102, mailed Jan. 31, 2007 (3 pages).
Written Opinion of the International Searching Authority in International Application No. PCT/IB2006/002102, mailed Jan. 31, 2007 (5 pages).

* cited by examiner

SENSOR UNIT

BACKGROUND OF THE INVENTION

1. Field of the Invention

The invention relates generally to a sensor unit, and more specifically, to a sensor unit that includes acceleration sensors and angular velocity sensors and that is used, for example, to control attitude of a robot.

2. Description of the Related Art

Acceleration sensors and angular velocity sensors are used to control attitude of a movable body such as a robot. Three axes of the robot that are orthogonal to each other are referred to as an X-axis, a Y-axis, and a Z-axis. Accelerations that act in the directions in which the X-axis, the Y-axis, and the Z-axis extend are detected by the respective three acceleration sensors. Angular velocities about the X-axis, the Y-axis, and the Z-axis are detected by the respective three angular velocity sensors. An angle about an axis or an attitude angle is obtained by temporally integrating outputs from the angular velocity sensor, and a pitch angle, a roll angle and a yaw angle are calculated.

Japanese Patent Application Publication No. JP-A-2004-268730 describes a technology for performing attitude control using the data concerning acceleration and the data concerning attitude that are transmitted from a gyro sensor.

When acceleration sensors are used, for example, in a robot, it is necessary to accurately set the orientations of the acceleration sensors such that the directions of accelerations, which act on the acceleration sensors and which the acceleration sensors should detect, accurately match the directions in which the X-axis, the Y-axis, and the Z-axis of the robot extend, respectively. Thus, it is possible to reduce the influence, on each acceleration sensor, of the accelerations that act in the directions in which the other axes extend (e.g., in the case of the acceleration sensor that detects the acceleration which acts in the direction in which the X-axis extends, it is possible to reduce the influence, on this acceleration sensor, of the accelerations that act in the directions in which the Y-axis and the Z-axis extend). When the acceleration sensors are fitted to a sensor unit, or when the acceleration sensors are replaced with new ones, it is necessary to accurately arrange the acceleration sensors at the appropriate positions. It is also necessary to correct or compensate for temperature drifts that are caused in the acceleration sensors.

When the angular velocity sensors are used, for example, in a robot, it is necessary to reduce the influence of external vibration, especially, high-frequency vibration such as vibration of a motor servo in order to maintain accuracy in the attitude angle.

SUMMARY OF THE INVENTION

The invention provides a sensor unit in which acceleration sensors or angular velocity sensors are accurately fixed at appropriate positions.

A first aspect of the invention relates to a sensor unit including acceleration sensors. The sensor unit includes a reference base, an acceleration sensor block, and acceleration sensors. The reference base has reference faces used to fix the acceleration sensors at appropriate positions. The acceleration sensor block has a rectangular prism shape. The acceleration sensor block is positioned using at least the bottom face and one of the side faces of the reference base as the reference faces. The acceleration sensor block is arranged on the reference base so as to be held upright relative to the reference base. The acceleration sensors are fitted to the faces of the acceleration sensor block. The acceleration sensors are fitted to the three faces of the acceleration sensor block, that are, the face parallel to the bottom face of the reference base, the face that has a certain positional relationship with one of sides of the reference base and that is orthogonal to the bottom face of the reference base, and the face that is orthogonal to the other two faces among these three faces, respectively. The acceleration sensors detect the accelerations that act in the directions in which the X-axis, the Y-axis, and the Z-axis extend, respectively. The X-axis, the Y-axis, and the Z-axis are orthogonal to each other.

According to the first aspect, the reference base is provided in the sensor unit, and the acceleration sensors are positioned using at least two faces of the reference base as the reference faces. The acceleration sensor block, to which the acceleration sensors are fitted, is arranged on the reference block so as to be held upright relative to the reference base. The acceleration sensor block is arranged on the reference base such that the upper face of the acceleration sensor block is parallel to the bottom face of the reference base, and the two side faces of the acceleration sensor block are orthogonal to the bottom face of the reference block. The three acceleration sensors are easily and accurately positioned by fitting the acceleration sensors to the upper face and the two side faces of the acceleration sensor block. When the reference base configures the X-Y plane, the acceleration sensor block extends in the direction in which the Z-axis extends, and the upper face and the two side faces of the acceleration sensor block define the X-axis, the Y-axis, and the Z-axis, respectively. The three acceleration sensors that are fitted to the three faces of the acceleration sensor block detect the accelerations that act in the directions in which the X-axis, the Y-axis, and the Z-axis extend, respectively. Accurately positioning the reference base such that the X-axis and the Y-axis of the reference base match the X-axis and the Y-axis of the robot, respectively, makes it possible to accurately position the acceleration sensors with respect to the orientation of the robot.

In the first aspect of the invention, a temperature sensor may be fitted to the acceleration sensor block at a position near the acceleration sensors. The temperature detected by the temperature sensor is used to correct or compensate for the outputs from the acceleration sensors. Therefore, the accelerations can be detected accurately by compensating for temperature drifts caused in the acceleration sensors. Although any material may be used to form the acceleration sensor block, the material having high thermal conductivity may be used in order to accurately measure the temperature of the acceleration sensors using the temperature sensor.

The sensor unit according to the first aspect may further include first support members, second support members, and third support members that are arranged on the reference base so as to be held upright relative to the reference base, using the bottom face of the reference base as the reference face; a first angular velocity sensor that is fixed to a face of a board which is fitted to the first support members via respective vibration-proofing elastic members such that the first angular velocity sensor is parallel to the bottom face of the reference base, and that detects an angular velocity about the X-axis; a second angular velocity sensor that is fixed to a face of a board which is fitted to the second support members via respective vibration-proofing elastic members such that the second angular velocity sensor is parallel to the bottom face of the reference base, and that detects an angular velocity around the Y-axis; and a third angular velocity sensor that is fixed to a face of a board which is fitted to the third support members via respective vibration-proofing elastic members such that the third angular velocity sensor is orthogonal to the bottom face and the one side face of the reference base, and that detects an angular velocity about the Z-axis. Because the angular velocity sensors are fixed to the boards that are fitted to the support members arranged using the reference faces of the reference base as the references, the angular velocity sensors are easily and accurately fixed at the appropriate positions, as in the case of the acceleration sensors. In addition, the angular velocity sensors are fixed to the boards that are fitted to the support members via vibration-proofing elastic members. Accordingly, the influence of external vibration can be suppressed.

The aspects of the invention makes it possible to accurately fix the acceleration sensors or the angular velocity sensors at appropriate positions. Therefore, the accuracy in fitting of the acceleration sensors is mechanically ensured.

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein.

DETAILED DESCRIPTION OF THE EXAMPLE EMBODIMENT

Hereafter, an embodiment of the invention will be described in detail with reference to accompanying drawings.

Figure 1:
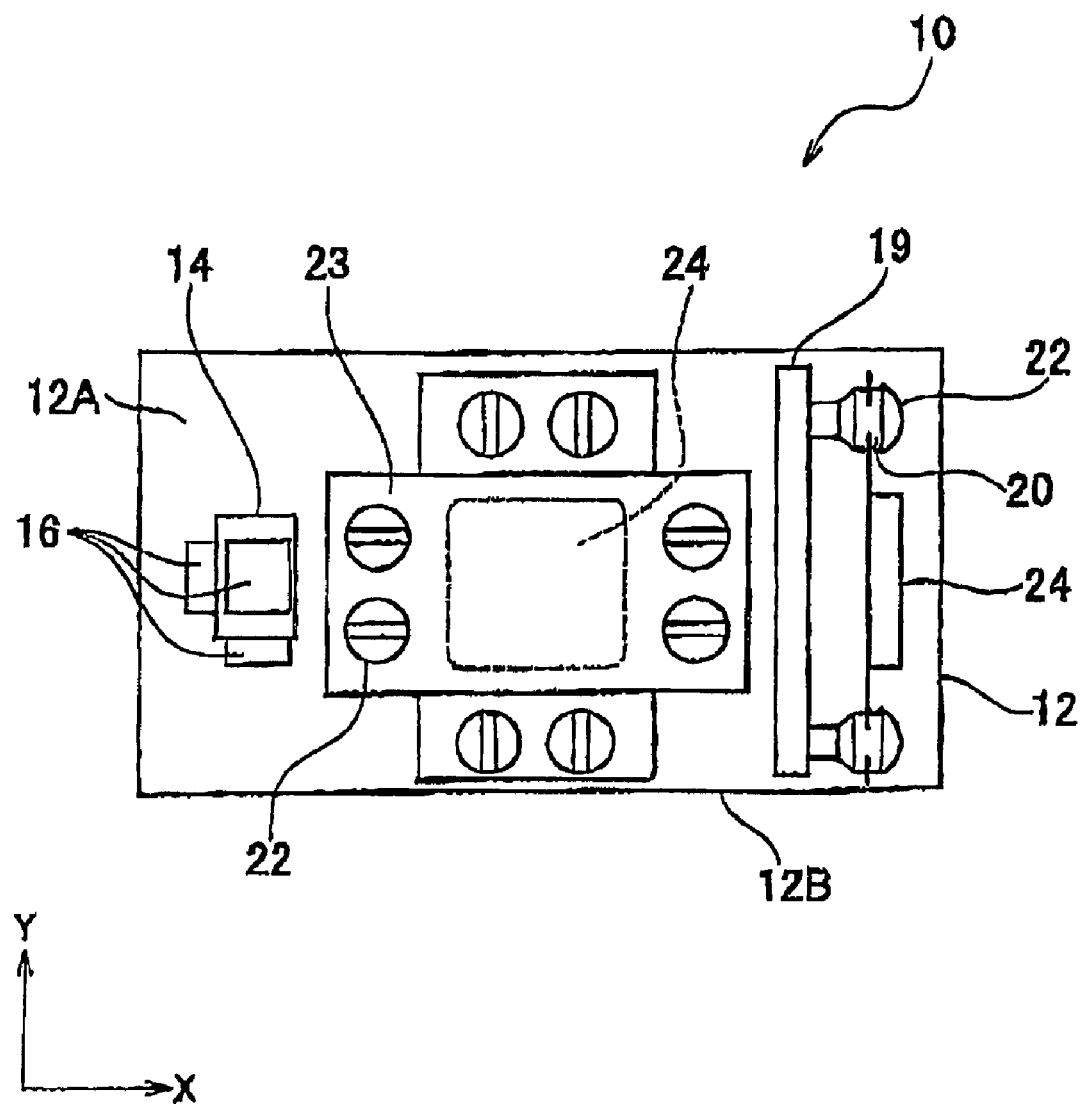
FIG. 1 illustrates the plan view of a sensor unit according to an embodiment of the invention.
Figure 2:
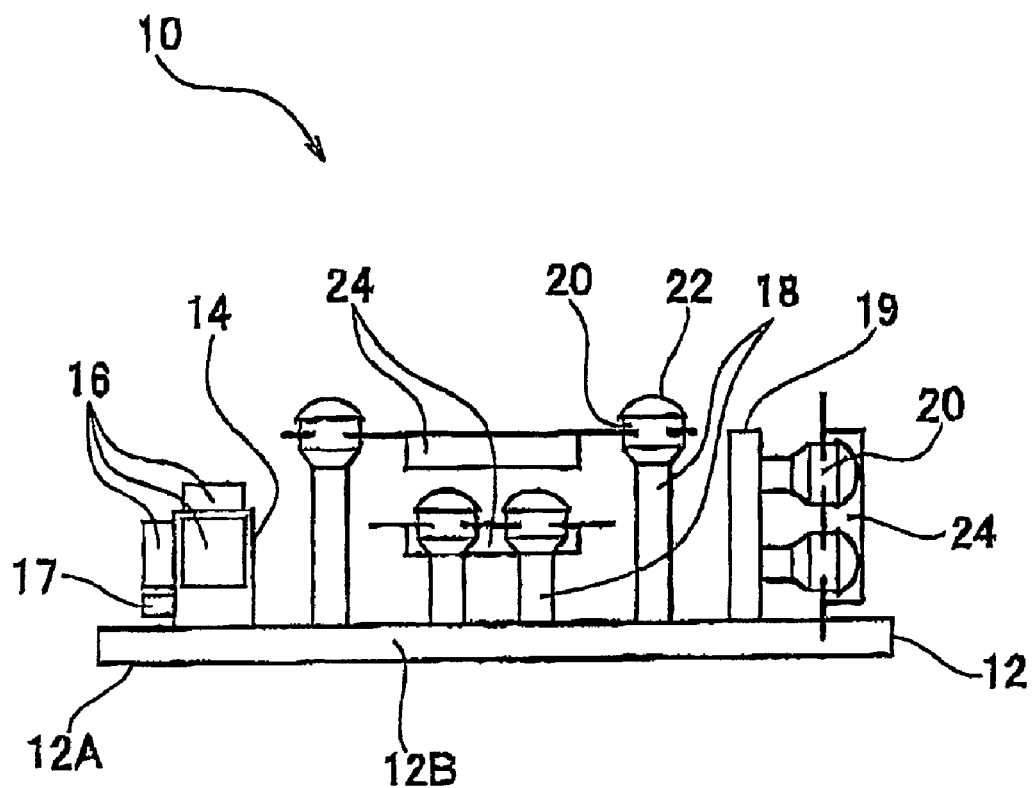
FIG. 2 illustrates the side view of the sensor unit according to the embodiment of the invention.

FIG. 1 illustrates the plan view of a sensor unit 10 according to the embodiment of the invention. FIG. 2 illustrates the side view of the sensor unit 10 according to the embodiment of the invention. Although the sensor unit 10 is actually housed in a case (not shown), FIGS. 1 and 2 each show the sensor unit 10 without the case (i.e., FIGS. 1 and 2 each show the configuration inside the case).

The sensor unit 10 has a reference base 12 at its base. The reference base 12 is a flat plate having a rectangular shape, when viewed from above. The reference base 12 provides fitting reference faces that are used as the reference faces when the acceleration sensors and the angular velocity sensors are arranged on the reference base 12. More specifically, a bottom face 12A and a side face 12B of the reference base 12 are used as the reference faces. The reference base 12 is made of metal such as aluminum.

An acceleration sensor block 14 is held upright relative to the reference base 12 at a predetermined position, using the two reference faces 12A and 12B of the reference base 12 as the references for positioning. The acceleration sensor block 14 is a rectangular prism. The acceleration sensor block 14 is positioned such that the upper face thereof is parallel to the reference face 12A and the side faces thereof is orthogonal to the reference face 12A. Also, the acceleration sensor block 14 is positioned such that one of the two side faces, orthogonal to each other, is parallel to the reference face 12B and the other side face is orthogonal to the reference face 12B. The acceleration sensor block 14 may be formed separately from the reference base 12. Alternatively, the acceleration sensor block 14 may be integrally formed with the reference base 12. The acceleration sensor block 14 is made of metal having high thermal conductivity, for example, aluminum. This is because the temperatures of the acceleration sensors are measured by a temperature sensor fitted to the acceleration sensor block 14, as described later in detail. The three faces, i.e., the upper face and the two side faces, orthogonal to each other, of the acceleration sensor block 14 define an X-axis, a Y-axis, and a Z-axis of an orthogonal coordinate system. The normal vector of the upper face of the acceleration sensor block 14 is parallel to the Z-axis. The normal vectors of the two side faces, orthogonal to each other, of the acceleration sensor block 14 are parallel to the X-axis and the Y-axis, respectively.

Three acceleration sensors 16, i.e., a first acceleration sensor, a second acceleration sensor, and a third acceleration sensor are bonded to the respective three faces of the acceleration sensor block 14. The first acceleration sensor is bonded to one of the two side faces orthogonal to each other. The second acceleration sensor is bonded to the other of the two side faces orthogonal to each other. The third acceleration sensor is bonded to the upper face. Each face of the acceleration sensor block 14 is accurately positioned with respect to the reference faces of the reference base 12. Accordingly, if each acceleration sensor 16 is bonded to the acceleration sensor block 14 using, for example, a jig, such that the face of the acceleration sensor 16, which is used to measure the acceleration, is parallel to the face of the sensor block 14, to which this acceleration sensor 16 is bonded, the following effect is obtained. The orientations of the acceleration sensors 16 can be easily set such that the directions of accelerations, which act on the acceleration sensors 16 and which the acceleration sensors 16 should detect, accurately match the directions in which the X-axis, the Y-axis, and the Z-axis of a robot extend, respectively. Because the reference base 12 or the sensor unit 10 including the reference base 12 is accurately positioned and fixed in the robot, the directions of the accelerations, which the acceleration sensors 16 should detect, accurately match the X-axis, the Y-axis and the Z-axis of the robot, respectively. When the acceleration sensors 16 are replaced with new ones, the above-described effect is obtained by accurately bonding the new acceleration sensors 16 to the corresponding faces of the acceleration sensor block 14.

A temperature sensor 17 is arranged on one of the side faces of the acceleration sensor block 14, at a position near the acceleration sensors 16. In FIG. 2, the temperature sensor 17 is arranged at a position below the acceleration sensors 16, However, the position of the temperature sensor 17 is not limited to the position in FIG. 2. The temperature sensor 17 may be arranged at a position above the acceleration sensors 16. The acceleration sensor block 14 is made of metal baying high thermal conductivity such as aluminum. Accordingly, arranging the temperature sensor 17 near the acceleration sensors 16 makes it possible to accurately detect the temperature of the acceleration sensors 16. The data obtained by the temperature sensor 17 may be corrected based on the distance between the temperature sensor 17 and the acceleration sensors 16. The data concerning the temperature of the acceleration sensors 16, which is obtained by the temperature sensor 17, is used to correct or compensate for temperature drifts caused in the acceleration sensors 16. A main processor corrects the output from the acceleration sensor 16 based on the output from the temperature sensor 17, according to a correction table or a correction equation set and stored in memory in advance.

Four angular velocity sensor support rods 18, serving as support members, makes one set. The four angular sensor support rods 18 in each set are held upright relative to the upper face of the reference base 12 so as to be positioned at four corners of a rectangle. In FIG. 1, two sets of angular velocity sensor support rods 18, namely, eight angular velocity sensor support rods 18 are held upright relative to the upper face of the reference base 12 to fit two angular velocity sensors 24, that is, a first angular velocity sensor 24 and a second angular velocity sensor 24. The eight angular velocity sensor support rods 18 are grouped into four angular velocity sensor support rods 18 in a first set and the other four angular velocity sensor supports rods 18 in a second set. The angular velocity sensor support rod 18 in the first set is shorter than the angular velocity sensor support rod 18 in the second set. The long side of the rectangle defined by the four angular velocity sensor support rods 18 in the first set is orthogonal to the long side of the rectangle defined by the four angular velocity sensor support rods 18 in the second set. The longer side of the rectangle defined by the four angular velocity sensor support rods 18 in the first set is orthogonal to the reference face 12B. The longer side of the rectangle defined by the four angular velocity sensor support rods 18 in the second set is parallel to the reference face 12B. The longer side of the rectangle defined by the four angular velocity sensor support rods 18 in the first set is parallel to the Y-axis, and the shorter side thereof is parallel to the X-axis. The longer side of the rectangle defined by the four angular velocity sensor support rods 18 in the second set is parallel to the X-axis, and the shorter side thereof is parallel to the Y-axis. The "rectangle" means the rectangle in which the four angular velocity sensor support rods 18 are positioned at its respective four corners. The angular velocity sensor support rods 18 in the first set and the second set are held upright relative to the bottom face 12A of the reference base 12. The upper end portion of each angular velocity sensor support rod 18 is formed in a substantially inverted-cone shape so as to serve as a vibration-proofing rubber bushing rest.

An angular velocity sensor fitting block 19 is held upright relative to the reference base 12 at a position adjacent to the angular velocity sensor support rods 18. The angular velocity sensor fitting block 19 is a flat plate. Four angular velocity sensor support rods 18 in a third set are held upright relative to one of side faces of the angular velocity sensor fitting block 19. These four angular velocity sensor support rods 18 are arranged so as to extend in the direction in which the X-axis extends. The longer side of a rectangle defined by the four angular velocity sensor support rods 18 in the third set extends parallel to the Y-axis. The shorter side of the rectangle defined by the four angular velocity sensor support rods 18 in the third set is orthogonal to each of the X-axis and the Y-axis, and parallel to the Z-axis.

The first angular velocity sensor 24 is fitted to a printed circuit board 23 that is fixed to the angular velocity sensor support rods 18 in the first set with screws 22 via rubber bushings 20 serving as vibration-proofing elastic members. Similarly, the second angular velocity sensor 24 is fitted to another printed circuit board 23 that is fixed to the angular velocity sensor support rods 18 in the second set with other screws 22 via other rubber bushings 20. The first angular velocity sensor 24 detects the angular velocity about the X-axis. The second angular velocity sensor 24 detects the angular velocity about the Y-axis. Another angular velocity sensor 24, that is, a third angular velocity sensor 24 is fitted to another printed circuit board 23. This printed circuit board 23 is fixed the angular velocity sensor support rods 18 in the third set with other screws 22 via other rubber bushings 20. These angular velocity sensor support rods 18 in the third set are held upright relative to one of side faces of the angular velocity sensor fitting block 19. This side face is orthogonal to the reference face 12B. The third angular velocity sensor 24 detects the angular velocity about the Z-axis.

Figure 3:
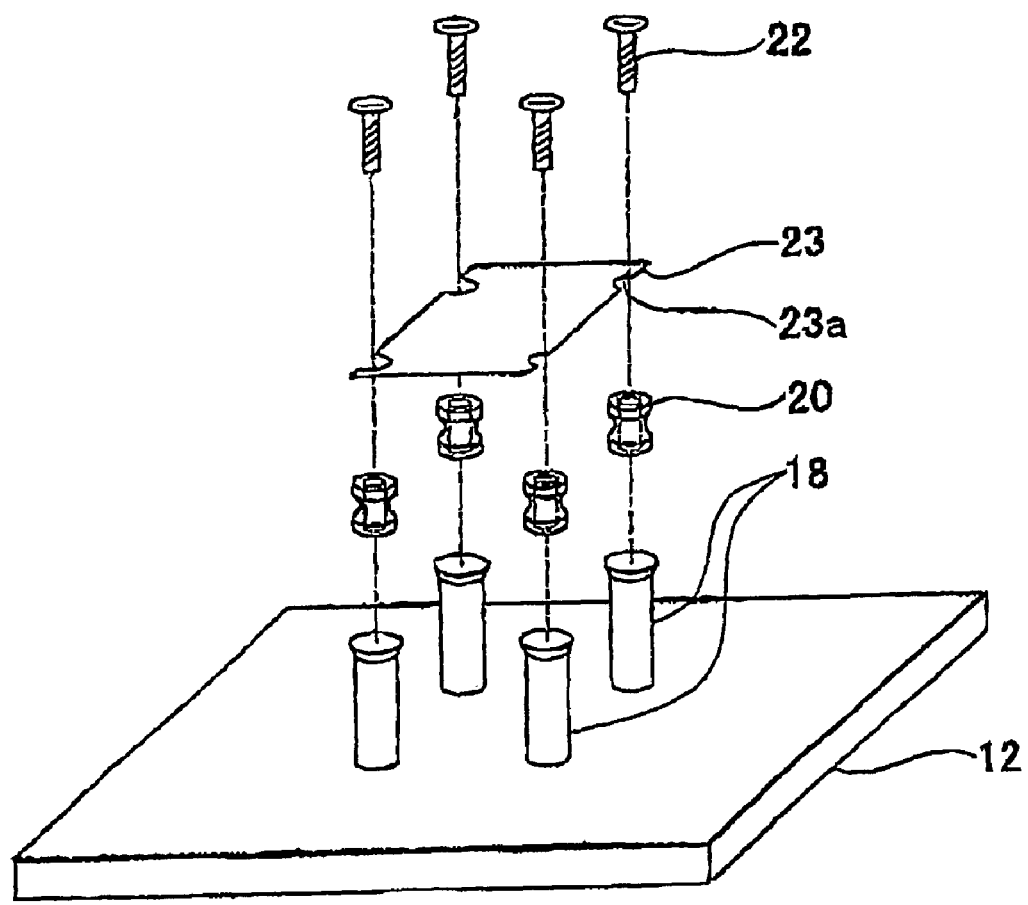
FIG. 3 illustrates the exploded perspective view partially showing the sensor unit according to the embodiment of the invention.
Figure 3:
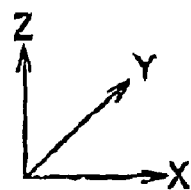

FIG. 3 is the exploded perspective view of the first angular velocity sensor 24 that detects the angular velocity about the X-axis. The four angular velocity sensor support rods 18 are held upright relative to the bottom face 12A of the reference base 12. The printed circuit board 23 is fixed to the angular velocity sensor support rods 18 with the screws 22 via the rubber bushings 20, The first angular velocity sensor 24 is connected to a circuit in the printed circuit board 23. Each rubber bushing 20 has a through hole. Each rubber bushing 20 is formed such that the cross section of each of both ends is greater than the cross section of the other portion. Notches 23a, to which the rubber bushings 20 are fitted, are formed in the printed circuit board 23 at the positions at which the rubber bushings 20 contact the printed circuit board 23. The printed circuit board 23 is supported by the angular velocity sensor support rods 18 via the rubber bushings 20. The rubber bushings 20 serve as the vibration-proofing rubber members, whereby transfer of external vibration caused, for example, by a motor servo to the first angular velocity sensor 24 is suppressed. When the printed circuit board 23 is fixed to the angular velocity sensor support rods 18 with the screws 22, the rubber bushings 20 are deformed based on the tightening force and the spring constant of the rubber bushings 20. However, the rubber bushings 20 are deformed substantially uniformly, because the rubber-bushing rest of each angular velocity sensor support rod 18 is formed such that the face, which contacts the rubber bushing 20, is sufficiently wide and flat. This suppresses a tilt of the first angular velocity sensor 24 due to uneven deformation of the rubber bushings 20 caused when the printed circuit board 23 is fixed to the angular velocity sensor support rods 18 with the screws 22. Similar description applies to the other angular velocity sensors 24.

According to the embodiment of the invention described so far, the reference base 12 is provided in the sensor unit 10, and the acceleration sensors 16 and the angular velocity sensors 24 are positioned and fixed using the two faces of the reference base 12 as the references. Accordingly, it is possible to perform accurate measurements, and easily arrange the sensors at the appropriate positions when they are replaced with the new ones.

According to the embodiment of the invention, the temperature sensor 17, along with the acceleration sensors 16, is fitted to the acceleration sensor block 14 having high thermal conductivity, which is used for positioning. Accordingly, it is possible to accurately measure the temperature of the acceleration sensors 16, and compensate for the temperature drifts caused in the acceleration sensors 16.

According to the embodiment of the invention, the angular velocity sensors 24 are fitted to the respective printed circuit boards, which are fixed to the angular velocity sensor support rods 18 via the rubber bushings 20. It is, therefore, possible to avoid the influence of the external vibration, thereby accurately measuring the angular velocity. In addition, the attitude angle around each axis can be detected by temporally integrating the angular velocity. The resonance frequency of the angular velocity sensor 24 depends on a mass "m" of the printed circuit 23 and a spring constant "k" of the rubber bushing 20. Therefore, the mass "m" and the spring constant "k" should be adjusted to appropriate values.

Any types of acceleration sensors and angular velocity sensors may be used as the acceleration sensors 16 and the angular velocity sensors 24 in the embodiment of the invention. For example, the angular velocity sensor 24 may be made of crystal, polycrystalline silicon, monocrystalline silicon, a thin metal film, piezoelectric substance, metal and piezoelectric substance, or the like.

According to the embodiment of the invention, both the acceleration sensors 16 and the angular velocity sensors 24 are arranged on the reference base 12. However, only the acceleration sensor block 14 and the acceleration sensors 16 may be arranged on the reference base 12.

According to the embodiment of the invention, the acceleration sensors 16, the angular velocity sensors 24 that detect the angular velocities about the X-axis and the Y-axis, and the angular velocity sensor 24 that detects the angular velocity about the Z-axis are arranged on the reference base 12, in this order, from the left side toward the right side of FIG. 1. However, the order of the arrangement of these sensors may be changed. For example, the acceleration sensors 16, the angular velocity sensor that detects the angular velocity about the Z-axis, and the angular velocity sensors 24 that detect the angular velocities about the X-axis and the Y-axis may be arranged on the reference base 12, in this order, from the left side toward the right side of the figure. Alternatively, the angular velocity sensors 24 that detect the angular velocities about the X-axis and the Y-axis, the acceleration sensors 16, and the angular velocity sensor 24 that detects the angular velocity about the Z-axis may be arranged on the reference base 12, in this order, from the left side toward the right side of the figure.

According to the embodiment of the invention, the acceleration sensors 16 and the angular velocity sensors 24 are positioned using the bottom face 12A and the side face 12B of the reference base 12 as the reference faces. However, another side face of the reference base 12 may be used as the reference face.

According to the embodiment of the invention, the sensor unit 10 is fitted to the robot to control the attitude of the robot. However, the invention is not limited to the embodiment described above. The sensor unit 10 according to the invention may be fitted to any types of movable bodies that have freedom in movements in the direction in which the X-axis, the Y-axis and the Z-axis extend, and freedom in rotational movement around the X-axis, the Y-axis and the Z-axis.

What is claimed is:

1. A sensor unit, comprising:
    a reference base including a bottom face, sides, and side faces;
    a block that has a rectangular prism shape, that is positioned using at least the bottom face and one of the side faces of the reference base as reference faces, and that is arranged on the reference base so as to be held upright relative to the reference base, wherein the block has a first face, which is parallel to the bottom face of the reference base, a second face, which has a certain positional relationship with one of the sides of the reference base and which is orthogonal to the bottom face of the reference base, and a third face, which is orthogonal to each of the first face and the second face;
    a first acceleration sensor that is fitted to the first face, and that detects an acceleration which acts in a direction in which a Z-axis extends;
    a second acceleration sensor that is fitted to the second face, and that detects an acceleration which acts in a direction in which an X-axis extends; and
    a third acceleration sensor that is fitted to the third face, and that detects an acceleration which acts in a direction in which a Y-axis extends;
    first support members, second support members, and third support members that are arranged on the reference base so as to be held upright relative to the reference base, using the bottom face of the reference base as the reference face;
    a first angular velocity sensor that is fixed to a face of a board which is fitted to the first support members via respective vibration-proofing elastic members such that the first angular velocity sensor is parallel to the bottom face of the reference base, and that detects an angular velocity about the X-axis;
    a second angular velocity sensor that is fixed to a face of a board which is fitted to the second support members via respective vibration-proofing elastic members such that the second angular velocity sensor is parallel to the bottom face of the reference base, and that detects an angular velocity around the Y-axis; and
    a third angular velocity sensor that is fixed to a face of a board which is fitted to the third support members via respective vibration-proofing elastic members such that the third angular velocity sensor is orthogonal to the bottom face and the one side face of the reference base, and that detects an angular velocity about the Z-axis, wherein
    the X-axis, the Y-axis, and the Z-axis are orthogonal to each other.

2. The sensor unit according to claim 1, wherein block is positioned so that the second face is parallel to the one of the sides of the reference base.

3. The sensor unit according to claim 1, further comprising:
    a temperature sensor that is fitted to the block, and that is arranged near the acceleration sensors; and
    a processor that corrects outputs from the acceleration sensors based on a temperature detected by the temperature sensor.

4. The sensor unit according to claim 1, wherein
    the vibration-proofing elastic members are rubber bushings, and
    rubber-bushing rests are formed at end portions of the first support members, the second support members and the third support members, the end portions contacting the rubber bushings, such that the rubber bushings are deformed substantially uniformly when the boards, to which the first angular velocity sensor, the second angular velocity sensor and the third angular velocity sensors are fitted, are fitted, via the rubber bushings, to the first support members, the second support members and the third support members with screws, respectively.

* * * * *